(12) United States Patent
Malone et al.

(10) Patent No.: US 8,838,315 B2
(45) Date of Patent: Sep. 16, 2014

(54) SYSTEM AND METHOD FOR INDICATING DELAY IN IMPLEMENTATION OF AN ENERGY-EXPENDING ACTION IN A POWERED VEHICLE SYSTEM

(71) Applicant: Ford Global Technologies, LLC, Dearborn, MI (US)

(72) Inventors: Mark Douglas Malone, Canton, MI (US); Tuan Anh Be, Livonia, MI (US); William Najib Mansur, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 13/622,302

(22) Filed: Sep. 18, 2012

(65) Prior Publication Data

US 2014/0081492 A1 Mar. 20, 2014

(51) Int. Cl.
- *G06F 17/00* (2006.01)
- *G06F 7/00* (2006.01)
- *G05D 3/00* (2006.01)
- *G05D 1/00* (2006.01)
- *B60L 11/00* (2006.01)
- *B60L 9/00* (2006.01)

(52) U.S. Cl.
USPC ............................................ 701/22; 903/930

(58) Field of Classification Search
USPC ............ 701/22, 67, 120, 102, 1, 98; 180/165, 180/65.29, 167, 65.31, 65.265, 65.22, 180/65.285; 320/108; 930/930; 477/3, 5, 4
See application file for complete search history.

(56) References Cited

U.S. PATENT DOCUMENTS

| | | | |
|---|---|---|---|
| 7,173,347 B2 * | 2/2007 | Tani et al. | 307/10.1 |
| 7,269,484 B2 | 9/2007 | Hein | |
| 8,058,982 B2 * | 11/2011 | Crowe et al. | 340/455 |
| 2007/0116089 A1 | 5/2007 | Bisch et al. | |
| 2007/0281753 A1 | 12/2007 | Dobler et al. | |
| 2011/0172864 A1 * | 7/2011 | Syed et al. | 701/22 |
| 2012/0061163 A1 | 3/2012 | Musser | |
| 2012/0215430 A1 * | 8/2012 | Watanabe et al. | 701/113 |
| 2012/0232730 A1 * | 9/2012 | Sujan et al. | 701/22 |
| 2013/0179014 A1 * | 7/2013 | Yamazaki et al. | 701/22 |
| 2013/0297115 A1 * | 11/2013 | Doering et al. | 701/22 |
| 2013/0297121 A1 * | 11/2013 | Reed et al. | 701/22 |
| 2013/0325238 A1 * | 12/2013 | Kato et al. | 701/22 |
| 2014/0081492 A1 * | 3/2014 | Malone et al. | 701/22 |

FOREIGN PATENT DOCUMENTS

JP         4289415 A      10/1992

* cited by examiner

*Primary Examiner* — Thomas G Black
*Assistant Examiner* — Robert Payne
(74) *Attorney, Agent, or Firm* — Julia Voutyras; Alleman Hall McCoy Russell & Tuttle LLP

(57) ABSTRACT

A method for operation of a vehicle by a control system is provided. The method comprises indicating to a vehicle operator a delay in implementation of an energy-expending action in a powered vehicle system in response to receiving an implementation request from an input device based on vehicle energy usage via a delay indicator.

20 Claims, 6 Drawing Sheets

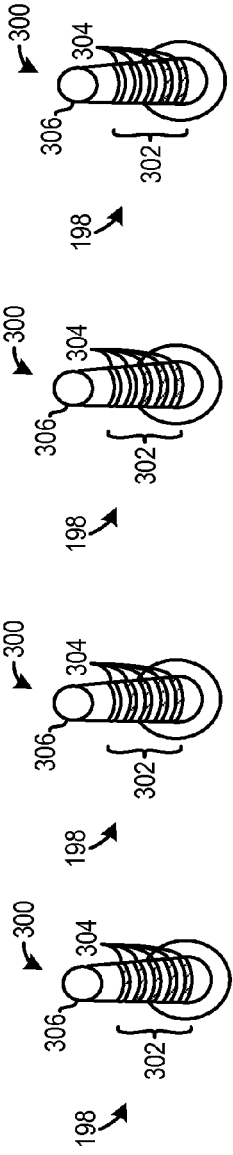
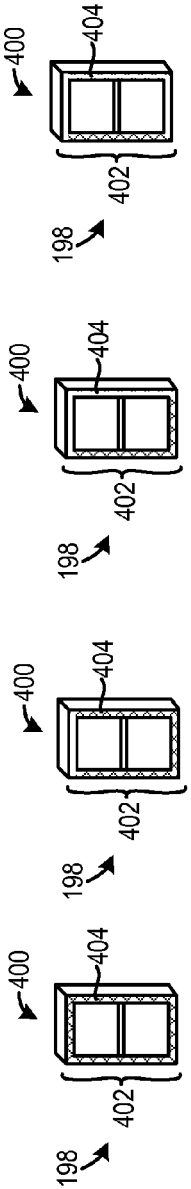
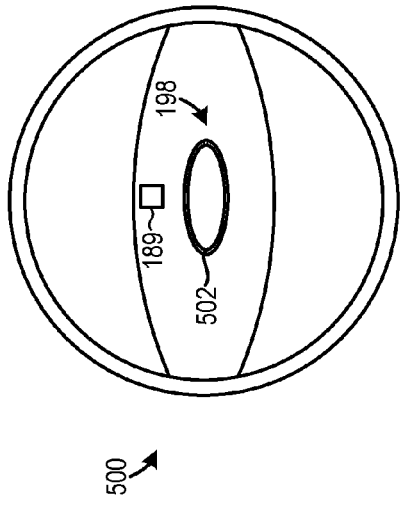
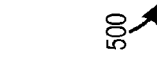

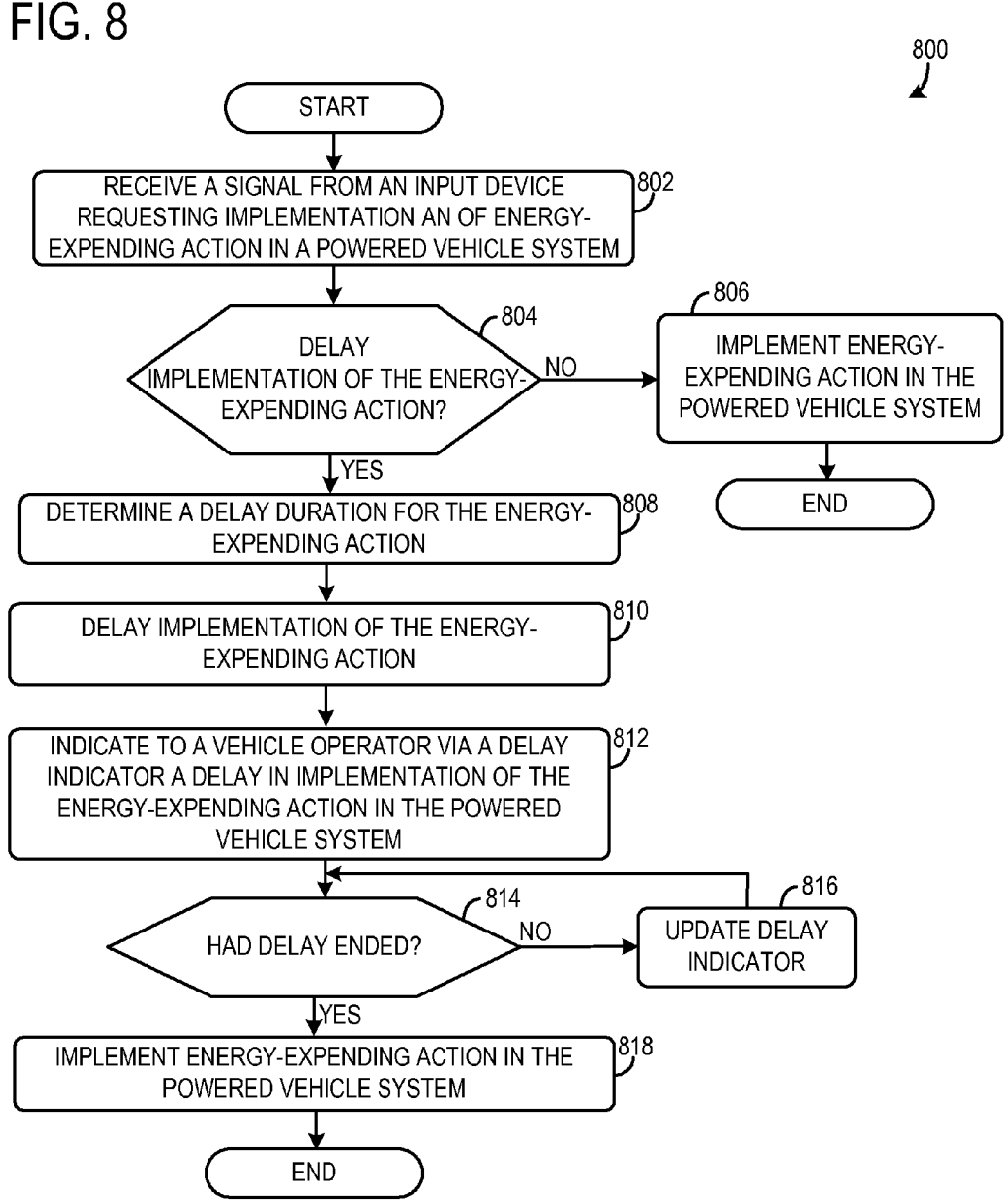

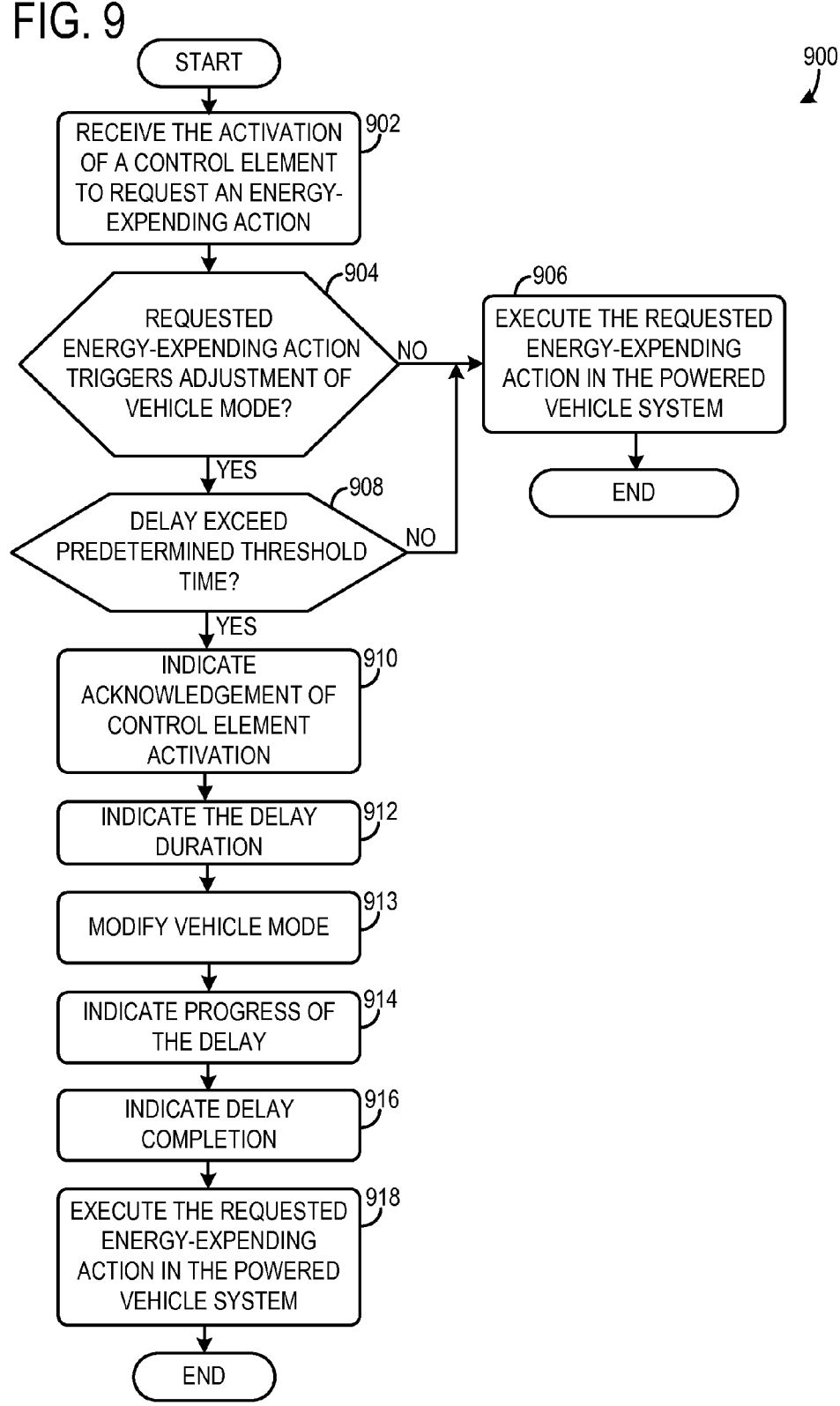

SYSTEM AND METHOD FOR INDICATING DELAY IN IMPLEMENTATION OF AN ENERGY-EXPENDING ACTION IN A POWERED VEHICLE SYSTEM

FIELD

The present disclosure relates to a method for indicating a delay in implementation of an energy-expending action in a vehicle.

BACKGROUND AND SUMMARY

Vehicles may contain a large number of powered systems receiving energy from a battery or other energy storage devices. Furthermore, some vehicles may employ fuel economizing techniques, such as deceleration fuel shut-off (DSFO), start-stop operation, etc., as well as energy economizing techniques for energy storage devices. For example, hybrid electric vehicles may employ both fuel economizing techniques as well as energy economizing techniques.

Due to the aforementioned fuel and energy economizing techniques, the vehicle may have a threshold energy usage which may fluctuate depending on operating conditions in the vehicle. Therefore, the number of actions that may be performed in parallel via powered vehicle systems may be limited, in some cases. Furthermore, during certain periods of vehicle operation it may be desirable to inhibit certain actions performed by the powered vehicle systems due to their power usage, such as when the engine is temporarily shut-down during start-stop operation.

The inability to perform certain actions in parallel or temporarily inhibiting certain actions may lead delayed implementation of specified actions. However, vehicle operators may expect a quick response (e.g., substantially instantaneous) after requesting an action. Thus, the delayed implementation of these actions may confuse a vehicle operator which may lead to repetitive input requests for the action. Ultimately, the vehicle operator may be dissatisfied when they are unsure why actions are delayed.

Furthermore, the inability to perform certain actions in parallel may lead to prioritization of certain actions. As a result, the delay corresponding to the different actions may be varied. This may be viewed by the vehicle operator as inconsistent behavior. Therefore, variance in delay times may further confuse vehicle operators, leading to additional customer dissatisfaction.

To solve at least some of the aforementioned problems a method for operation of a vehicle by a control system is provided. The method comprises indicating to a vehicle operator a delay in implementation of an energy-expending action in a powered vehicle system in response to receiving an implementation request from an input device based on vehicle energy usage via a delay indicator.

In this way, by notifying the operator of the delay, the operator can understand why certain actions may be delayed, and can further expect such actions. This can reduce the likelihood of operator confusion. The delay indicator may be positioned in a vehicle cabin and may be integrated into the input device and provide visual cues of the duration of the delay, in one example. In this way, a vehicle operator is provided with an easily observable and intuitive indication that reduces concerns over whether a command has been received and provides reassurance that the commands will be acted upon in a predictable manner. In other words, the indication or notification to the operator can not only indicate the delay, but also that the input was properly received and processed. As such, the likelihood of repeated actuation of the input device due to operator confusion may be reduced. As a result, the vehicle operator may be less distracted and more satisfied with vehicle performance.

In one example, the delay may be indicated if the vehicle energy usage will exceed a threshold value after the energy-expending action is implemented. In this way, an energy economizing strategy may be employed in the vehicle while alerting the vehicle operator of delays associated with the strategy. As such, the indications and/or notifications may be responsive to the energy usage currently experience in the vehicle, so that the indications and notifications can be suppressed when no delay is expected.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIGS. 3A-3D show sequential illustrations of an example input device having an integrated delay indicator indicating a duration of delay, the input device may be included in the vehicle shown in FIG. 1;

FIGS. 4A-4D show sequential illustrations of another example input device having an integrated delay indicator indicating a duration of delay, the input device may be included in the vehicle shown in FIG. 1;

FIGS. 5-6 show additional example input devices and delay indicators;

FIGS. 8 and 9 show method for operation for a vehicle by a control system.

DETAILED DESCRIPTION

A method for alerting and notifying a vehicle operator of a delayed response to a requested energy-expending action in a powered vehicle system is described herein, including optionally additionally notifying the driver that the requested action was received and processed through a separate indication. The alert may be provided through a delay indicator via adjustment in appearance of the indicator. Additionally, the delay indicator may provide different indications that convey the duration of the delay to the vehicle operator. In this way, the vehicle operator is provided with feedback after an energy-expending action is requested, thereby reducing operator confusion about vehicle operation. As a result, operator satisfaction may be increased. In some examples, the delay indicator may be integrated into an input device for requesting the energy-expending action. In this way, the operator may intuitively associate the delay indicator with the requested action, further reducing confusion.

Figure 1:
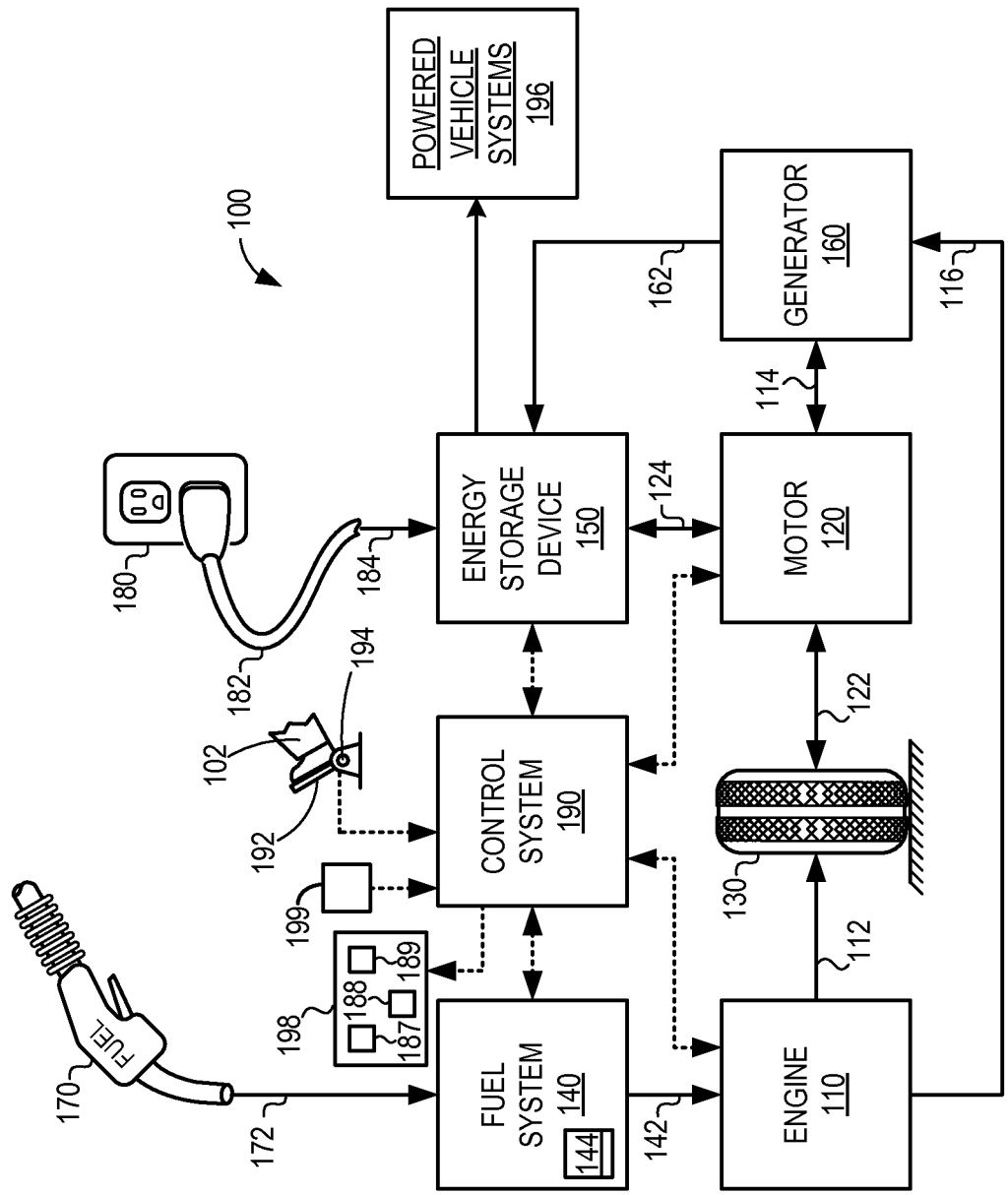
FIG. 1 shows a schematic depiction of a vehicle.
Figure 2:
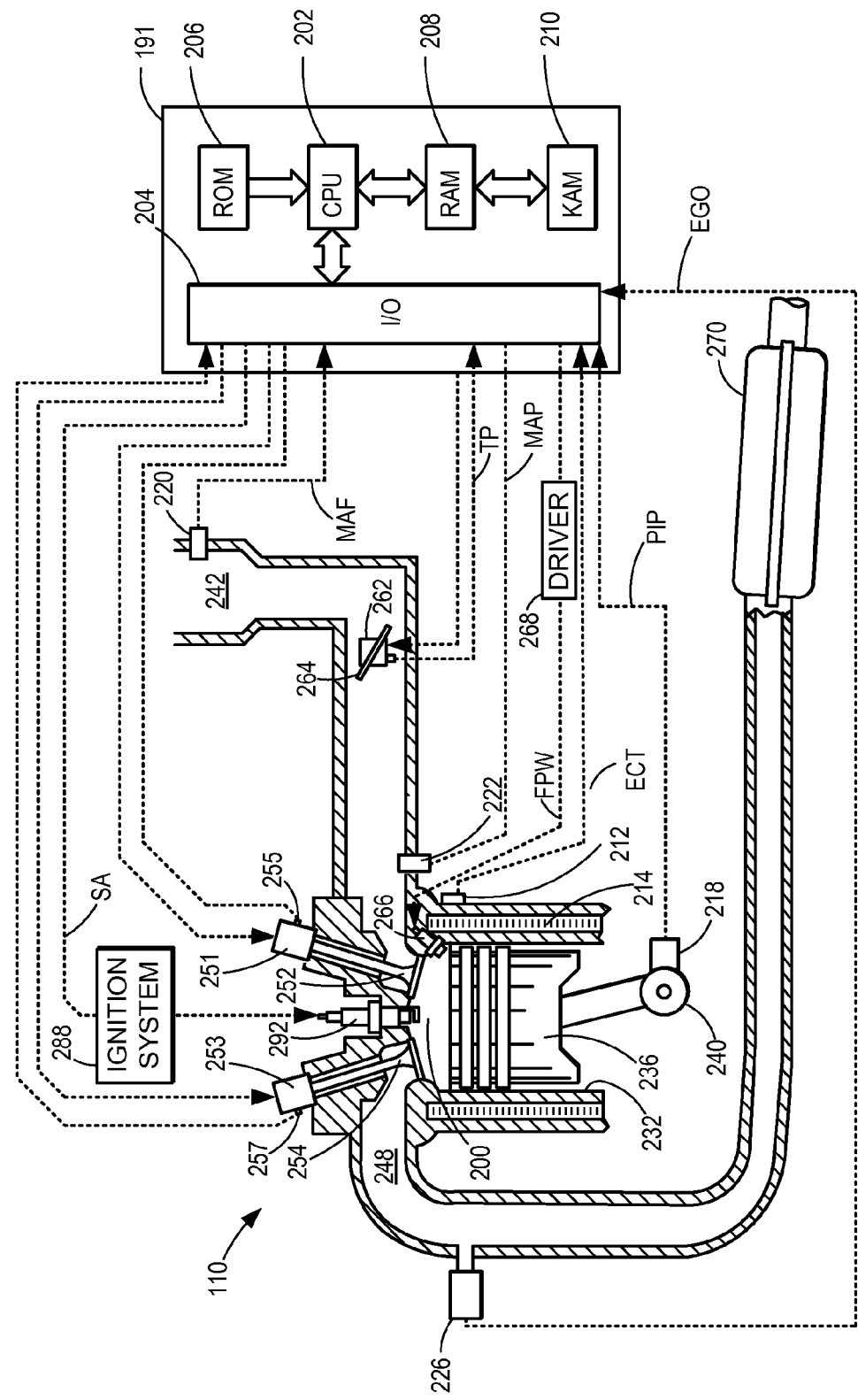
FIG. 2 shows a schematic depiction of an engine included in the vehicle shown in FIG. 1.
Figure 6:
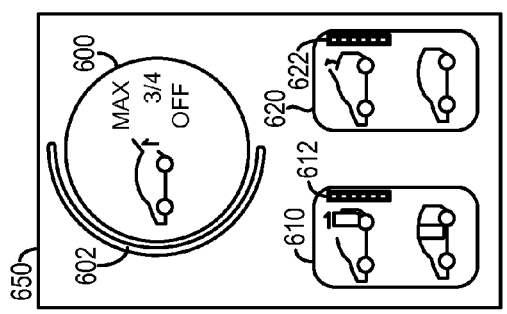
Figure 7:
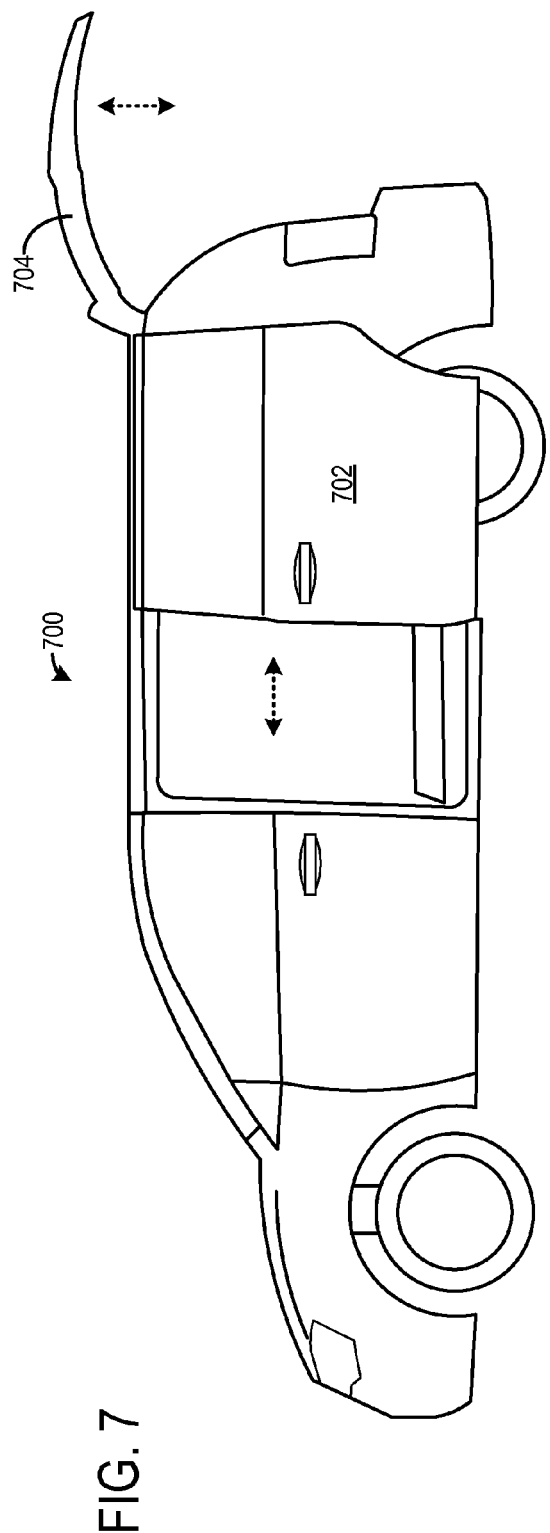
FIG. 7 shows an example vehicle.

FIG. 1 shows a schematic depiction of a vehicle and FIG. 2 shows a schematic depiction of an engine included in the vehicle. FIGS. 3A-3D and 4A-4D show sequential illustrations of example input devices having integrated delay indicators indicating a duration of delay. FIGS. 5-6 show additional example input devices and delay indicators and FIG. 7 shows an example vehicle which may be controlled via the input devices shown in FIGS. 5-6. FIGS. 8 and 9 show methods for operation for a vehicle by a control system.

FIG. 1 illustrates an example vehicle 100. Vehicle 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline, alcohol (e.g., methanol, ethanol), diesel, bio-diesel, etc.,) to produce an engine output while motor 120 may consume electrical energy to produce a motor output. As such, vehicle 100 may be referred to as a hybrid electric vehicle (HEV).

Vehicle 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated. Thus, the motor 120 may provide motive power to the drive wheel 130.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. Therefore, the energy storage device 150 may supply energy to the powered vehicle systems 196, discussed in greater detail herein. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal or an accelerator pedal.

Energy storage device 150 may periodically receive electrical energy from a power source 180 residing external the vehicle (e.g. not part of the vehicle) as indicated by arrow 184. As a non-limiting example, vehicle 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable may electrically couple energy storage device 150 and power source 180. While the vehicle propulsion system is operated to propel the vehicle, electrical transmission cable 182 may disconnected between power source 180 and energy storage device 150. Control system 190 may identify the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically received fuel from a fuel source residing external the vehicle. As a non-limiting example, vehicle 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor.

As described herein, engine 110 may be periodically set to a deactivated state where the consumption of fuel at the engine is significantly reduced or discontinued. This deactivation (e.g., temporary deactivation) and subsequent start-up may be referred to as start-stop operation. Start-stop operation may reduce fuel consumption in the vehicle. Further, engine 110 may be set to inhibit fuel delivery to a cylinder during desired time intervals. Inhibiting fuel delivery in this way may be referred to as deceleration fuel shut-off (DFSO). DFSO may be initiated based on power output of the engine, in some examples.

The vehicle 100 further includes powered vehicle systems 196. The powered vehicle system 196 may include one or more of a powered lift gate system, a powered window system, a powered door (e.g., a powered sliding door) system, a powered sun-roof system, a powered steering system, and an entertainment system (e.g., stereo system). Each of the aforementioned powered vehicle systems 196 is configured to implement an energy-expending action. For example, the powered lift gate may be configured to open (e.g., lift) and/or close a rear tailgate or rear door and the powered window system may be configured to open and close a window in the vehicle. It will be appreciated that the powered window system may open and close a window through one touch opening/closing input. Additionally, the powered door system may be configured to open and close a door (e.g., sliding door) and the powered sun-roof system may be configured to open and close a sun-roof. The power-steering system may be configured to increase power delivered to turning the wheels for steering for example via hydraulics, an electric motor, etc.

Additionally, the control system 190 may be configured to manage energy use in the vehicle. Specifically, the control system 190 may be configured to prioritize energy-expending actions executed via the powered vehicle systems 196. Therefore in some examples, implementation of energy-expending actions may be delayed based on vehicle energy usage. Method for managing energy use in the vehicle and indicating a delay in implementation of energy expending actions are shown in FIGS. 8-9 and discussed in greater detail herein.

A delay indicator 198 may be provided in the vehicle 100. The delay indicator 198 may be included in the control system 190. The delay indicator 198 is configured to indicate a delay in implementation of a requested energy-expending action in one of the powered vehicle systems 196. The delay indicator 198 may include a visual cue apparatus 187, an audio cue apparatus 188, and/or a tactile cue apparatus 189. The visual cue apparatus 187 may be configured to provide a visual delay cue, proportional to the delay, if it is determined that an requested energy-expending action is delayed. In this way, the delay (e.g., duration of the delay) may be visually indicated. The audio cue apparatuses 188 (e.g., speakers) may be configured to provide an auditory delay cue if it is determined that a requested energy-expending action is delayed. The tactile cue apparatus 189 may be configured to provide a tactile cue (e.g., vibrations, pulses, etc.,) if it is determined that a requested energy-expending action is delayed.

An input device 199 may also be provided in the vehicle 100. The input device 199 may be included in the control system 190. The input device 199 is configured to request implementation of an energy-expending action in one of the powered vehicle systems 196 in response to actuation of the device via the vehicle operator. The input device may be a button, switch, touch interface, touch screen, knob, etc. The delay indicator 198 and the input device 199 may be in electronic communication (e.g., wired and/or wireless) with a controller 191, shown in FIG. 2. The controller 191, shown in FIG. 2, may be electronically coupled to the energy storage device 150.

FIG. 2 illustrates a non-limiting example of a cylinder 200 of engine 110, including the intake and exhaust system components that interface with the cylinder. Note that cylinder 200 may correspond to one of a plurality of engine cylinders. Cylinder 200 is at least partially defined by combustion chamber walls 232 and piston 236. Piston 236 may be coupled to a crankshaft 240 via a crank arm, along with other pistons of the engine. Crankshaft 240 may be operatively coupled with drive wheel 130, motor 120 or generator 160 via a transmission.

Cylinder 200 may receive intake air via an intake passage 242. Intake passage 242 may also communicate with other cylinders of engine 110. Intake passage 242 may include a throttle 262 including a throttle plate 264 that may be adjusted by control system 190 to vary the flow of intake air that is provided to the engine cylinders. Cylinder 200 can communicate with intake passage 242 via one or more intake valves 252. Cylinder 200 may exhaust products of combustion via an exhaust passage 248. Cylinder 200 can fluidly communicate with exhaust passage 248 via one or more exhaust valves 253.

In some examples, cylinder 200 may optionally include a spark plug 292, which may be actuated by an ignition system 288. A fuel injector 266 may be provided in the cylinder to deliver fuel directly thereto. Additionally or alternatively a fuel injector may be arranged within intake passage 242 upstream of intake valve 252, providing what is known as port injection. Fuel injector 266 may be actuated by a driver 268.

In this example, intake valve 252 and exhaust valve 254 may be controlled by cam actuation via respective cam actuation systems 251 and 253. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 255 and 257, respectively. In alternative examples, intake valve 252 and/or exhaust valve 254 may be controlled by electric valve actuation. For example, cylinder 30 may alternatively include an intake valve controlled via electric valve actuation and an exhaust valve controlled via cam actuation including CPS and/or VCT systems.

Controller 191 is shown in FIG. 1 as a microcomputer, including microprocessor unit 202, input/output ports 204, an electronic storage medium for executable programs and calibration values shown as read only memory 206 in this particular example, random access memory 208, keep alive memory 210, and a data bus. Controller 191 may receive various signals from sensors coupled to engine 110. Microprocessor unit 202 can communicate with various sensors and actuators of engine 110 via an input/output device 204. In other examples, the microprocessor unit 202 may generally be a processor. The controller 191 may be included in the control system 190 shown in FIG. 1. Additionally, it will be appreciated that the memory 206 may comprise instructions executable by the processor 202 to perform the methods, control schemas, etc., described herein.

As a non-limiting example, these sensors may provide sensory feedback in the form of operating condition information to the controller 191, and may include: an indication of mass airflow (MAF) through intake passage 242 via sensor 230, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of intake valve position via sensor 255, and an indication of exhaust valve position via sensor 257, among others. The aforementioned sensors may be included in the controls system 190, shown in FIG. 1.

Furthermore, the controller 191 may control operation of the engine 110, including cylinder 200 via one or more of the following actuators: driver 268 to vary fuel injection timing and quantity, ignition system 288 to vary spark timing, intake valve actuator system 251 to vary intake valve timing, exhaust valve actuator 253 to vary exhaust valve timing, and throttle 262 to vary the position of throttle plate 264, among others. Note that intake and exhaust valve actuator systems 251 and 253 may include electromagnetic valve actuators (EVA) and/or cam-follower based actuators. The driver, ignition system, valve actuators, and throttle may be included in the control system 190 shown in FIG. 1. The controller 191 may also control operation of the delay indicator 198, shown in FIG. 1 and receive control signals from the input device 199, shown in FIG. 1.

Additionally, the exhaust system may include an emission control device 270. Emission control device 270 is shown arranged along exhaust passage 248 downstream of exhaust gas sensor 226. Device 70 may be a three way catalyst (TWC), NOx trap, various other emission control devices, or combinations thereof. In some examples, emission control device 270 may be a first one of a plurality of emission control devices positioned in the exhaust system.

FIGS. 3A-3D and 4A-4D each show sequential operation of example delay indicators integrated into input devices. The delay indicators include visual cue apparatuses in FIGS. 3A-3D and 4A-4D. Thus, the delay indicators provide visual delay cues of a delayed energy-consuming action implemented in a powered-vehicle system.

Specifically, FIG. 3A-3D shows the input device 199, shown in FIG. 1, as a button 300. The delay indicator 198 is integrated into the button 300. It will be appreciated that the button 300 may be actuated by an operator to request implementation of an energy-expending action in a powered vehicle system. Specifically, in one example the shaft 306 of the button 300 may be depressed or otherwise actuated to request implementation of an energy-consuming action in an associated powered vehicle system. The delay indicator 198 includes a visual cue apparatus 302 having a plurality of illuminated sections 304. It will be appreciated that the illuminated sections may be illuminated via a suitable light source such as a Light Emitting Diode (LED), an incandescent light bulb, fluorescent lights, a display (e.g., touch sensitive display), etc. The appearance of the illuminated sections 304 may adjusted after the button 300 is actuated to request implementation of an energy-expending action and it is determined that the requested energy-expending action will be delayed. Thus, a delay in action implementation is determined and indicated in FIGS. 3A-3D. Time progresses from FIG. 3A to FIG. 3B, FIG. 3B to FIG. 3C, and FIG. 3C to 3D. Therefore, the appearance of the visual cue apparatus 302 is adjusted to indicate a change in the duration of the delay in each of the figures. Thus, as time moves forward the duration of the delay is diminished. The change is appearance is shown through the elimination of the cross-hatching in the illuminated sections. This may indicate decreasing the brightness of the illuminated sections (e.g., un-illuminating the illuminated sections), changing the color of the illuminated section, etc. The illuminated sections 304 are spaced away from one another in the example shown in FIG. 3A-3D. Moreover, the illuminated sections surround the shaft 306 of the button 300. However, other input device and delay indicator configurations have been contemplated. However, it will be appreciated that in some examples the delay duration may be increased as time progresses.

FIGS. 4A-4D shows the input device 199, shown in FIG. 1, as a switch 400. The delay indicator 198 is integrated into the button 400. The delay indicator 198 includes a visual cue apparatus 402 having a plurality of illuminated sections 404. A delay is determined and indicated in FIGS. 4A-4D. Time progresses from FIG. 4A to FIG. 4B, FIG. 4B to FIG. 4C, and FIG. 4C to 4D. Therefore, the appearance of the visual cue apparatus 402 is adjusted to indicate a change in the duration of the delay. The change in cross-hatching indicates a change in appearance and specifically may indicate a decrease in illuminated area corresponding to a decrease in the duration of the delay.

FIG. 5 shows an example of the delay indicator 198 included in a steering wheel 500. It will be appreciated that the steering wheel may be positioned in a cabin of the vehicle 100. As shown, the delay indicator 198 includes an illuminated portion 502. The illuminated portion 502 may be included in a visual cue apparatus. The appearance of the illuminated portion 502 may adjusted in response to determining a delay of an energy-expending action requested via actuation of the input device 199, shown in FIG. 1, as previously discussed. The delay indicator 198 shown in FIG. 5 may correspond to a power steering action in a powered steering system in the vehicle. Therefore, the input device in FIG. 5 may be the steering wheel 500. In this way, the delay indicator is integrated into the input device. The steering wheel may also include the tactile cue apparatus 189, in some examples. Further in some examples, a first delay indicator may be provided to alert a vehicle operator that an input requesting a power expending action has been received and is being processed and a second delay indicator may be provided to indicate a duration of the delay. The first delay indicator may be separate from the second delay indicator. However, in other examples the first and second delay indicators may be integrated into a single component. It will be appreciated that the first and second delay indicators may be included in the vehicle 100, shown in FIG. 1.

FIG. 6 shows a plurality of input devices and delay indicators included in a control unit 650. A first input device 600 may be configured to request an opening/closing action in a powered lift gate system. As shown, various degrees of lift gate opening may be requested. A first delay indicator 602 is associated with the first input device 600. The first delay indicator 602 at least partially encircles the first input device 600 in the depicted example. A second input device 610 may be configured to request an opening/closing action in a powered door system. A second delay indicator 612 is integrated into the second input device 610. A third input device 620 is shown. A third delay indicator 622 is integrated into the third input device 620. The third input device 620 may be configured to request an opening/closing action in a powered sunroof system.

As previously discussed the visual appearance of the delay indicators may be adjusted in response to determination of delaying implementation of an energy-expending action in a powered vehicle system. Subsequently, the appearance of the delay indicators may be further periodically adjusted to indicate a decrease, or increase in some examples, in the duration of the delay. In this way, a vehicle operator may be made aware of the delay and in particular the duration of the delay, decreasing the likelihood of operator confusion and in some cases repeated actuation of the input device via the vehicle operator. As a result, customer satisfaction is increased.

Additionally, the control unit 650 may be included in a cabin of the vehicle 100, shown in FIG. 1, or may be a remote control unit 650 configured to wirelessly communication with the control system 190, shown in FIG. 1.

FIG. 7 show an example vehicle 700. The vehicle 700 is an example of vehicle 100, shown in FIG. 1. The vehicle 700 includes a door 702 that may be opened/closed by one of the powered vehicle systems 196 (e.g., a powered door system), shown in FIG. 1. The vehicle 700 further includes a rear gate 704 that may be opened/closed by one of the powered vehicle systems 196 (e.g., a powered lift gate system), shown in FIG. 1. It will be appreciated that opening/closing of the door 702 by the powered door system may be requested via the second input device 610, shown in FIG. 6. Likewise, the opening/closing of the rear gate 704 by the powered lift gate system may be requested via the first input device 600, shown in FIG. 6.

FIG. 8 shows a method 800 for operation of a vehicle via a control system. The method 800 maybe implemented by the vehicle, control system, engine, components, etc., described above with regard to FIGS. 1-7 or may be implemented by another suitable vehicle, control system, engine, and components.

At 802 the method includes receiving a signal from an input device requesting implementation of an energy-expending action in a powered vehicle system. Next at 804 the method includes determining if implementation of the energy-expending action will be delayed. The delay determination may be based on vehicle energy usage and/or the mode of vehicle operation (e.g., DFSO, stop-start operation). The vehicle energy usage may be the input and/or output of an energy storage device (e.g., battery) and/or the engine's fuel consumption. In some examples, the energy output of the energy storage device provided to the powered vehicle systems may be 12 volts (V). It will be appreciated that additional energy-expending actions may be currently executed in the vehicle. Therefore, the vehicle energy usage may be determined based on the additional energy-expending actions. In one example, it may be determined if the requested energy-expending action is expected increase energy usage in the vehicle (e.g., energy storage device output) above a threshold value. It will be appreciated that the threshold value may be adjusted depending on the operating conditions in the vehicle such as combustion operation in the engine, operator of the motor coupled to the energy storage device, operation of additional vehicle systems, etc.

If it is determined that implementation of the energy-expending action will not be delayed (NO at 804) the method includes at 806 implementing the energy-expending action in the powered vehicle system at an expected time interval. It will be appreciated that the expected time interval may be less than a delayed time interval. In some examples, the energy-expending action may be implemented directly after the determination.

However, if it is determined that the energy-expending action will be delayed (YES at 804) the method includes at 808 determining a delay duration for the energy-expending action. The delay duration for the energy-expending action may be calculated based on other energy-expending actions that are currently implemented in the vehicle or actions that have been requested for implementation in the vehicle, the mode of the vehicle, the operating conditions in the vehicle, etc.

At 810 the method includes delaying implementation of the energy-expending action for the duration determined at 808. At 812 the method includes indicating to a vehicle operator via a delay indicator a delay in implementation of the energy-expending action in the powered vehicle system. As previously discussed, the delay may be indicated via a change in appearance of the delay indicator that may be positioned in a cabin of the vehicle, in one example. In some examples the method may include after step 812 and before step 814 implementing a second energy-expending action in a second powered vehicle system, the first and second energy-expending actions implemented at non-overlapping intervals. Further, in some examples, indicating to a vehicle operator via a delay indicator a delay in implementation of the energy-expending action in the powered vehicle system includes providing a visual delay cue, proportional to the delay, to a vehicle operator via a visual cue apparatus included in the delay indicator. Additionally, the delay indication is responsive to a powertrain operating mode and electrical energy storage level in the vehicle.

At 814 it is determined if the delay has ended. If the delay has not ended (NO at 814) the method may include at 816 updating the delay indicator. The delay indicator may be updated based on the delay duration and the period of time that has passed. Therefore, the appearance of the delay indicator may be further adjusted responsive to a decrease in the duration of the delay, as previously discussed with regard to FIGS. 3A-3D and FIGS. 4A-4D. However, if it is determined that the delay has ended (YES at 814) the method includes at 818 implementing the energy-expending action in the powered vehicle system after the delay ends.

FIG. 9 shows another method 900 for operation of a vehicle via a control system. The method 900 maybe implemented by the vehicle, control system, engine, components, etc., described above with regard to FIGS. 1-7 or may be implemented by another suitable vehicle, control system, engine, and components.

At 902 the method includes receiving the activation of a control element to request an energy-expending action. The control element may be an input device and the vehicle operator may activate the control element. Next at 904 the method includes determining if the requested energy-expending action triggers adjustment of vehicle mode (e.g., fuel use mode (e.g., DFSO, start-stop operation). If it is determined that the requested energy-expending action does not trigger adjustment of the vehicle mode (NO at 904) the method includes at 906 executing the requested energy-expending action.

However, if the requested energy-expending action triggers adjustment of the vehicle mode (YES at 904) the method includes at 908 determining if a delay in execution of the energy-expending action will exceed a predetermined threshold value. The delay may be determined based on an expected duration needed to modify the vehicle mode, vehicle energy usage, and/or engine fuel consumption. The predetermined threshold value may correspond to a duration of time that is noticeable to the vehicle operator. However, other threshold values have been contemplated. If it is determined that the delay does not exceed the predetermined threshold value (NO at 908) the method proceeds to 906. However, if it is determined that the delay exceeds the predetermined threshold value (YES at 908) the method includes at 910 indicating acknowledgement of control element activation. In some examples, indicating acknowledgement may include changing the appearance of a delay indicator.

At 912 the method includes indicating the delay duration. Next at 913 the method includes modifying the vehicle mode. For example, the engine may be commanded to re-start combustion when combustion operation has been temporarily disabled in a star-stop mode. In another example, fuel injection may be commanded after fuel injection is temporarily inhibited in a DFSO mode. Specifically, the vehicle mode may be altered to enable the energy needs of the energy-expending action to be met. For example, the engine may be started after a temporary shut-down during a start-stop operation and/or fuel may be provided to the engine after fuel delivery to the engine has been temporarily inhibited during a DFSO operation.

Next at 914 the method may include indicating progress of the delay. In one example, the diminishing duration of the delay may be indicated via a delay indicator. In another example, indicating progress of the delay may be adjusted based on vehicle feedback. At 916 the method includes indicating completion of the delay. Again, the appearance of a delay indicator may be altered to indicate the completion. At 918 the method includes executing the requested energy-expending action in the powered vehicle system after delay completion. In this way, the mode of the vehicle may be adjusted based on a requested action and an operator may be made aware of a delay in execution of the action, if needed.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a vehicle by a controller electronically coupled to an input device and comprising instructions stored in memory executable by a processor operatively positioned proximate the controller comprising:
   receiving a request from the controller to implement an energy-expending action;
   delaying implementation of the energy-expending action based on vehicle energy usage; and
   communicating to a vehicle operator a delay in implementation of the energy-expending action in response to receiving an implementation request via a delay indicator via a delay indicator that is operatively positioned in the vehicle cabin.

2. The method of claim 1, where the vehicle energy usage includes engine fuel consumption in the vehicle and energy input and output of an energy storage device included in the vehicle.

3. The method of claim 2, where the delay is indicated if the energy-expending action will increase vehicle energy usage above a predetermined threshold value.

4. The method of claim 1, further comprising implementing the energy-expending action in the powered vehicle system after the delay ends.

5. The method of claim 1, where the powered vehicle system is one of a powered lift gate system, a powered window system, a powered door system, a powered sun-roof or convertible top system, and a powered steering system.

6. The method of claim 1, where indicating a delay includes providing a visual delay cue, proportional to the delay, to a vehicle operator via a visual cue apparatus included in the delay indicator.

7. The method of claim 1, where indicating a delay includes providing an auditory delay cue to a vehicle operator via an audio cue apparatus included in the delay indicator.

8. The method of claim 1, where indicating a delay includes providing a tactile delay cue to a vehicle operator via a tactile cue apparatus included in the delay indicator.

9. The method of claim 8, where the tactile cue apparatus is positioned in a steering wheel of the vehicle and the tactile delay cue comprising a vibration.

10. The method of claim 1, where the input device is a touch interface positioned within a vehicle cabin and included in the control system.

11. A vehicle comprising:
   an energy storage device;
   a powered vehicle system, electrically coupled to the energy storage device;
   an input device operatively positioned in the vehicle receiving input from a vehicle operator controlling an energy-expending action of the powered vehicle system; and
   a controller, electronically coupled to the energy storage device and the input device, the controller comprising instructions stored in memory executable by a processor to:
   receive a request to implement the energy-expending action in the powered vehicle system from the input device;

delay implementation of the energy-expending action based on vehicle power usage; and communicating a delay in implementation of the energy-expending action to an operator of the vehicle via a delay indicator that is operatively positioned in the vehicle cabin.

12. The vehicle of claim 11, where the energy storage device is a battery.

13. The vehicle of claim 12, where the battery provides power to a motor providing motive power to wheels during at least some vehicle operating conditions.

14. The vehicle of claim 11, where the vehicle includes an engine and the delay is implemented based on the engine being temporarily shut-down when the request to implement the energy-expending action is received by the controller.

15. The vehicle of claim 11, where indicating a delay in implementation of the energy-expending action includes providing a visual cue to a vehicle operator via a visual cue indicator, the visual cue indicator integrated into the input device.

16. The vehicle of claim 11, where indicating a delay including indicating a duration of the delay.

17. The vehicle of claim 16, where the duration of a delay is indicated by illuminated sections included in the delay indicator.

18. A method for operation of a vehicle via a controller electronically coupled to an input device and comprising instructions stored in memory executable by a processor comprising:

receiving an electronic control signal from the input device requesting implementation of an energy-expending action in a powered vehicle system;

communicating to a vehicle operator a delay in the implementation of the energy-expending action in the powered vehicle system via a delay indicator that is operatively positioned in the vehicle cabin; and implementing the requested energy-expending action in the powered vehicle system after the delay period has ended.

19. The method of claim 18, wherein the delay indication is responsive to a powertrain operating mode and electrical energy storage level in the vehicle, the method further comprising prior to implementing the requested energy-expending action, implementing a second energy-expending action in a second powered vehicle system, the first and second energy-expending actions implemented at non-overlapping intervals.

20. The method of claim 18, where indicating to a vehicle operator a delay in implementation of the energy-expending action includes visually indicating a duration of the delay.

* * * * *